United States Patent
Shen et al.

(10) Patent No.: US 10,889,659 B2
(45) Date of Patent: Jan. 12, 2021

(54) MODIFIED POLYMETHYLHYDROSILOXANE, MODIFIED HIGH-CIS CONJUGATED DIENE POLYMER, AND MANUFACTURING METHOD FOR THE SAME, AND RUBBER COMPOSITION AND TIRE USING THE SAME

(71) Applicant: Chi Mei Corporation, Tainan (TW)

(72) Inventors: Hsiu-Ping Shen, Tainan (TW); Kuan-Lin Hsieh, Tainan (TW)

(73) Assignee: CHI MEI CORPORATION, Tainan (TW)

( * ) Notice: Subject to any disclaimer, the term of this patent is extended or adjusted under 35 U.S.C. 154(b) by 18 days.

(21) Appl. No.: 16/258,871

(22) Filed: Jan. 28, 2019

(65) Prior Publication Data
US 2019/0241740 A1 Aug. 8, 2019

(51) Int. Cl.
| | | |
|---|---|---|
| C08C 19/25 | (2006.01) | |
| C08L 83/10 | (2006.01) | |
| C08L 83/06 | (2006.01) | |
| C08L 47/00 | (2006.01) | |
| B60C 1/00 | (2006.01) | |
| C08K 3/011 | (2018.01) | |
| C08K 3/08 | (2006.01) | |
| C08G 77/442 | (2006.01) | |
| C08G 81/02 | (2006.01) | |

(52) U.S. Cl.
CPC ............ *C08C 19/25* (2013.01); *B60C 1/0016* (2013.01); *C08G 77/442* (2013.01); *C08G 81/024* (2013.01); *C08K 3/011* (2018.01); *C08K 3/08* (2013.01); *C08L 47/00* (2013.01); *C08L 83/06* (2013.01); *C08L 83/10* (2013.01); *B60C 1/00* (2013.01); *C08K 2003/0812* (2013.01); *C08K 2003/0837* (2013.01); *C08K 2003/0881* (2013.01); *C08L 2312/08* (2013.01)

(58) Field of Classification Search
CPC ........ C08C 19/25; C08G 77/46; C08G 77/48; C08G 77/50; C08L 83/10
See application file for complete search history.

(56) References Cited

U.S. PATENT DOCUMENTS

| | | | | |
|---|---|---|---|---|
| 2002/0120057 A1* | 8/2002 | Gosselink | ............ | C11D 3/3742 524/588 |
| 2003/0100652 A1* | 5/2003 | Kim | ........................ | C08C 19/25 524/430 |
| 2009/0306269 A1 | 12/2009 | Ota | | |
| 2010/0031852 A1* | 2/2010 | Herrwerth | ............. | C04B 26/285 106/487 |
| 2014/0135422 A1* | 5/2014 | Thorlaksen | .......... | C09D 183/12 523/122 |
| 2014/0161618 A1* | 6/2014 | Walker | .................... | F01D 5/005 416/223 A |
| 2014/0179860 A1* | 6/2014 | Lee | .......................... | C08K 3/36 524/572 |
| 2014/0187723 A1* | 7/2014 | Hsieh | ..................... | C08C 19/44 525/332.9 |

(Continued)

FOREIGN PATENT DOCUMENTS

| | | |
|---|---|---|
| CN | 101611077 A | 12/2009 |
| JP | H0543696 A | 2/1993 |

(Continued)

OTHER PUBLICATIONS

Abstract for KR 2016/031712 (Mar. 2016).*
(Continued)

*Primary Examiner* — Marc S Zimmer
(74) *Attorney, Agent, or Firm* — McClure, Qualey & Rodack, LLP

(57) ABSTRACT

The present disclosure provides a modified polymethylhydrosiloxane, a modified high-cis conjugated diene polymer, and a manufacturing method for the same, and a rubber composition and a tire using the same. The manufacturing method for the modified high-cis conjugated diene polymer comprises: performing a polymerization reaction to form a high-cis conjugated diene polymer; and making the high-cis conjugated diene polymer react with a first modifier, and then react with a condensation accelerator and a second modifier to generate a modified high-cis conjugated diene polymer; wherein the modified high-cis conjugated diene polymer has over 97% of cis-1,4 structure. The second modifier comprises a compound represented by the following formula (1).

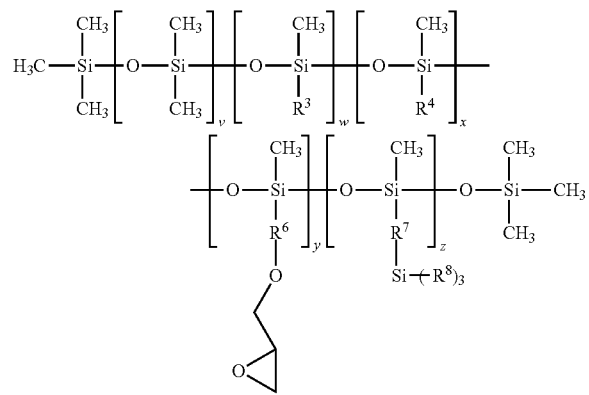

FORMULA (1)

15 Claims, No Drawings

(56) References Cited

U.S. PATENT DOCUMENTS

2017/0158797 A1* 6/2017 Ueda .................... B60C 1/0025

FOREIGN PATENT DOCUMENTS

| TW | 201326226 A | 7/2013 |
| TW | I486366 B | 6/2015 |
| WO | 2008004676 A1 | 1/2008 |

OTHER PUBLICATIONS

Chinese language office action dated Sep. 17, 2018, issued in application No. TW 107104392.
JP Office Action (with translation) dated Jun. 9, 2020 in JP application (No. 2019018387).

* cited by examiner

MODIFIED POLYMETHYLHYDROSILOXANE, MODIFIED HIGH-CIS CONJUGATED DIENE POLYMER, AND MANUFACTURING METHOD FOR THE SAME, AND RUBBER COMPOSITION AND TIRE USING THE SAME

This application claims the benefit of Taiwan application Serial No. 107104392, filed Feb. 7, 2018 and the benefit of Taiwan application Serial No. 107147265, filed Dec. 26, 2018, the subject matter of which is incorporated herein by reference.

BACKGROUND

Technical Field

The disclosure relates in general to a conjugated diene polymer, and particularly to a modified high-cis conjugated diene polymer.

Description of the Related Art

A conjugated diene polymer can be used to make tires, and therefore in consideration of energy saving and traffic safety, properties such as rolling resistance and wet skid resistance and so on thereof are very important. A known method includes adding carbon black in the conjugated diene polymer to increase the strength of the tire.

However, in recent years, due to environmental issues such as gradual depletion of oil resource and global warming, the tire industry has begun developing techniques of replacing carbon black with white carbon (main component: $SiO_2$, such as silica) to improve the rolling resistance of the tire and achieve the object of reducing energy loss. However, white carbon is less readily dispersed evenly in the conjugated diene polymer compared to carbon black. Therefore, how to obtain a modified conjugated diene polymer having high mixing compatibility with white carbon and provide low rolling resistance and excellent wet skid resistance to a tire made from the polymer is an important object for those skilled in the art.

SUMMARY

The present disclosure provides a modified polymethylhydrosiloxane, a modified high-cis conjugated diene polymer, and a manufacturing method for the same, and a rubber composition and a tire using the same.

The present disclosure provides a modified polymethylhydrosiloxane, comprising a compound represented by the following formula (1):

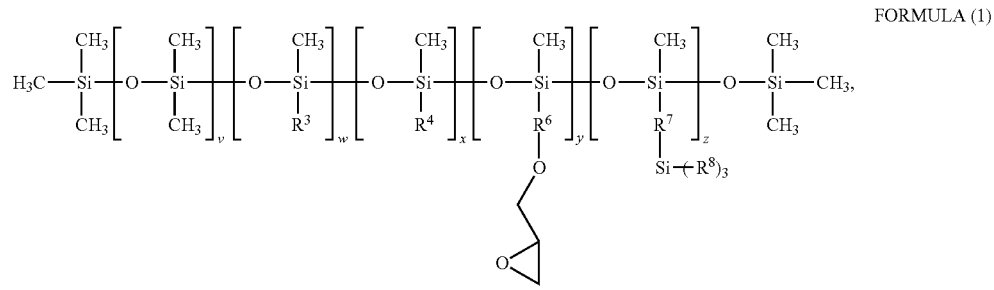

FORMULA (1)

wherein, $R^3$ comprise a substituted or un-substituted $C_6$-$C_{16}$ hydrocarbon group containing an aryl group, or a substituted or un-substituted $C_2$-$C_{16}$ hydrocarbon group containing an amino group, $R^4$ comprise a substituted or un-substituted $C_2$-$C_4$ alkylene group, a group of —$(O—C_2H_4)$—, and a group of —$OR^5$, $R^5$ are a hydrogen atom or a substituted or un-substituted $C_1$-$C_3$ alkyl group, $R^6$ are substituted or un-substituted $C_2$-$C_4$ alkylene groups, $R^7$ are substituted or un-substituted $C_2$-$C_4$ alkylene groups, $R^8$ are $C_1$-$C_3$ alkoxy groups, v is 170-400, w is 0-45, x is 0-71, y is 0-43, z is 5-34, a total of w, x and y is bigger than 0, a plurality of $R^3$ may be identical or different, a plurality of $R^4$ may be identical or different, a plurality of $R^5$ may be identical or different, a plurality of $R^6$ may be identical or different, a plurality of $R^7$ may be identical or different, and $R^8$ are identical or different.

The present disclosure provides a manufacturing method for a modified high-cis conjugated diene polymer, comprising: performing a polymerization reaction to form a high-cis conjugated diene polymer; and making the high-cis conjugated diene polymer react with a first modifier, and then react with a condensation accelerator and a second modifier to generate a modified high-cis conjugated diene polymer; wherein the modified high-cis conjugated diene polymer has over 97% of cis-1,4 structure. The first modifier comprises a compound represented by the following formula (2):

FORMULA (2)

, wherein $R^1$ is a functional group comprising a glycidoxy group, 2-(3,4-epoxycyclohexyl) group or an isocyanate group, $R^2$ are substituted or un-substituted $C_1$-$C_3$ alkyl groups, a is 0 or 1, a plurality of $R^2$ may be identical or different. The second modifier comprises a compound represented by the following formula (1):

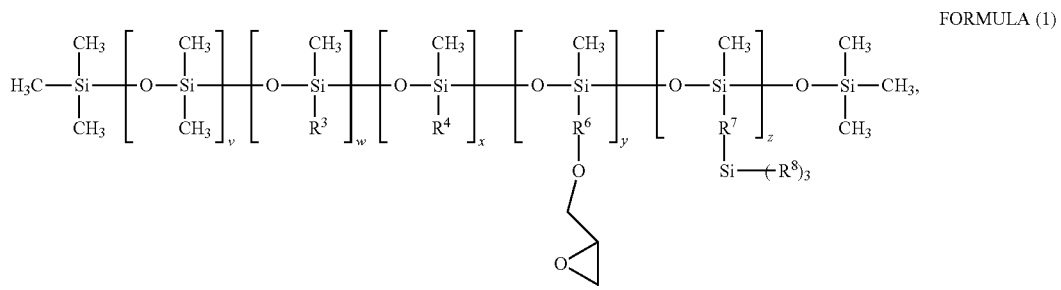

FORMULA (1)

wherein $R^3$ comprise a substituted or un-substituted $C_6$-$C_{16}$ hydrocarbon group containing an aryl group, or a substituted or un-substituted $C_2$-$C_{16}$ hydrocarbon group containing an amino group, $R^4$ comprise a substituted or un-substituted $C_2$-$C_4$ alkylene group, a group of —(O—$C_2H_4$)—, and a group of —$OR^5$, $R^5$ are a hydrogen atom or a substituted or un-substituted $C_1$-$C_3$ alkyl group, $R^6$ are substituted or un-substituted $C_2$-$C_4$ alkylene groups, $R^7$ are substituted or un-substituted $C_2$-$C_4$ alkylene groups, $R^8$ are $C_1$-$C_3$ alkoxy groups, v is 170-400, w is 0-45, x is 0-71, y is 0-43, z is 5-34, and a total of w, x and y is bigger than 0, a plurality of $R^3$ may be identical or different, a plurality of $R^4$ may be identical or different, a plurality of $R^5$ may be identical or different, a plurality of $R^6$ may be identical or different, a plurality of $R^7$ may be identical or different, and a plurality of $R^8$ may be identical or different.

The present disclosure provides a modified high-cis conjugated diene polymer, comprising a polymer represented by the following formula (3):

identical or different, a plurality of $R^3$ may be identical or different, a plurality of $R^4$ may be identical or different, a plurality of $R^5$ may be identical or different, a plurality of $R^6$ may be identical or different, a plurality of $R^7$ may be identical or different, and a plurality of $R^8$ may be identical or different.

The present disclosure also provides a rubber composition, comprising carbon black, white carbon and the modified high-cis conjugated diene polymer disclosed above.

The present disclosure also provides a tire, comprising the rubber composition disclosed above.

Accordingly, the present disclosure discloses a modified high-cis conjugated diene polymer and a manufacturing method for the same, and a rubber composition and a tire using the same. The rubber composition manufactured with using the modified high-cis conjugated diene polymer of the present disclosure has good wet skid resistance and low rolling resistance, has good compatibility with carbon black and white carbon (silica), and has good processability. The

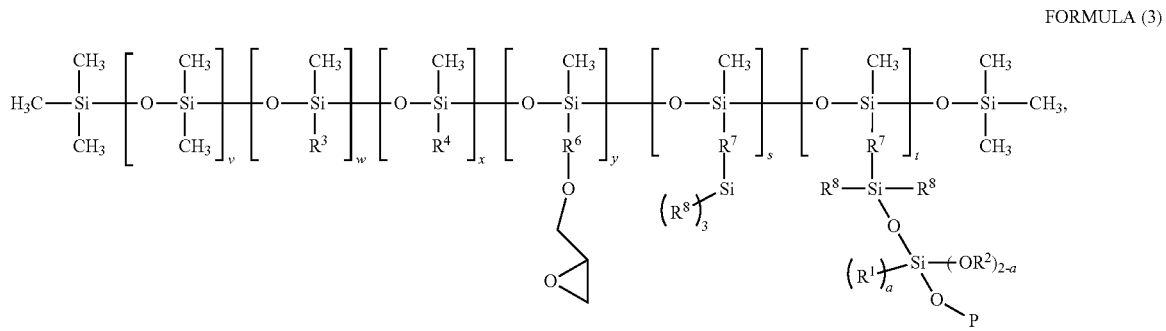

FORMULA (3)

wherein $R^1$ is a functional group comprising a glycidoxy group, 2-(3,4-epoxycyclohexyl) group or an isocyanate group, $R^2$ are substituted or un-substituted $C_1$-$C_3$ alkyl groups or a hydrogen atom, a is 0 or 1, $R^3$ comprise a substituted or un-substituted $C_6$-$C_{16}$ hydrocarbon group containing an aryl group, or a substituted or un-substituted $C_2$-$C_{16}$ hydrocarbon group containing an amino group, $R^4$ comprise a substituted or un-substituted $C_2$-$C_4$ alkylene group, a group of —(O—$C_2H_4$)—, and a group of —$OR^5$, $R^5$ are a hydrogen atom or a substituted or un-substituted $C_1$-$C_3$ alkyl group, $R^6$ are substituted or un-substituted $C_2$-$C_4$ alkylene groups, $R^7$ are substituted or un-substituted $C_2$-$C_4$ alkylene groups, $R^8$ are $C_1$-$C_3$ alkoxy group or hydroxyl group, P is a conjugated diene polymer having over 97% of cis-1,4 structure, v is 170-400, w is 0-45, x is 0-71, y is 0-43, and a total of w, x and y is bigger than 0, t is 1-34, z=t+s, and z is 5-34, a plurality of $R^2$ may be rubber composition can be used to manufacture the tire having good wet skid resistance and low rolling resistance.

The above and other embodiments of the disclosure will become better understood with regard to the following detailed description of the non-limiting embodiment(s). The following description is made with reference to the accompanying drawings.

BRIEF DESCRIPTION OF THE DRAWINGS none.

DETAILED DESCRIPTION

The following detailed description discloses a manufacturing method for the modified high-cis conjugated diene polymer according to embodiments of the present disclosure.

In the specification herein, if a group of a compound is not defined as being substituted or un-substituted, it means the group may be a substituted or un-substituted group. For example, "alkyl group" may be a substituted or un-substituted alkyl group. In addition, when a group is described with "$C_X$", it means a main chain of the group has carbon atom(s) of amount X.

In the specification herein, a compound structure may be presented by a skeleton formula. This kind of presentation may omit a carbon atom, a hydrogen atom and a carbon-hydrogen bond. Otherwise, the compound structure may be defined by presenting by a structure formula with a definite functional group.

The present disclosure provides a manufacturing method for a modified high-cis conjugated diene polymer. The manufacturing method for the modified high-cis conjugated diene polymer comprises: performing a polymerization reaction to form a high-cis conjugated diene polymer; and making the high-cis conjugated diene polymer react with a second modifier to generate a modified high-cis conjugated diene polymer. The modified high-cis conjugated diene polymer has over 97% of cis-1,4 structure. The second modifier comprises a compound represented by the following formula (1),

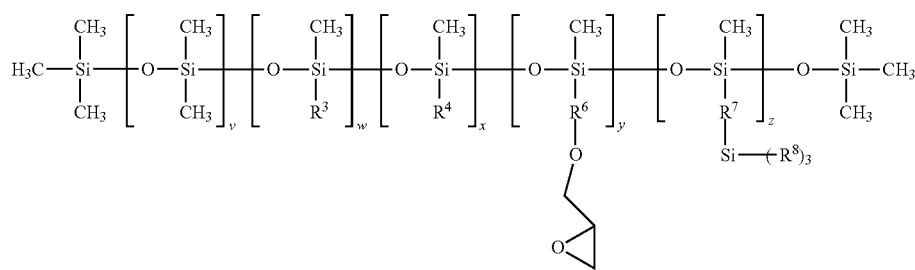

FORMULA (1)

$R^3$ comprise a substituted or un-substituted $C_6$-$C_{16}$ hydrocarbon group containing an aryl group, or a substituted or un-substituted $C_2$-$C_{16}$ hydrocarbon group containing an amino group. $R^4$ comprise a substituted or un-substituted $C_2$-$C_4$ alkylene group, a group of —(O—$C_2H_4$)—, and a group of —$OR^5$. $R^5$ are a hydrogen atom or a substituted or un-substituted $C_1$-$C_3$ alkyl group. $R^6$ are substituted or un-substituted $C_2$-$C_4$ alkylene groups. $R^7$ are substituted or un-substituted $C_2$-$C_4$ alkylene groups. $R^8$ are $C_1$-$C_3$ alkoxy groups. v is 170-400. w is 0-45. x is 0-71. y is 0-43. z is 5-34. In addition, a total of w, x and y is bigger than 0. A plurality of $R^3$ may be identical or different. A plurality of $R^4$ may be identical or different. A plurality of $R^5$ may be identical or different. A plurality of $R^6$ may be identical or different. A plurality of $R^7$ may be identical or different. Moreover, a plurality of $R^8$ may be identical or different.

The present disclosure also provides a manufacturing method for a modified high-cis conjugated diene polymer. The manufacturing method for the modified high-cis conjugated diene polymer comprises: performing a polymerization reaction to form a high-cis conjugated diene polymer; and making a terminal of the high-cis conjugated diene polymer react with a second modifier to generate a modified high-cis conjugated diene polymer. The modified high-cis conjugated diene polymer has over 97% of cis-1,4 structure.

In addition, the present disclosure also provides a manufacturing method for a modified high-cis conjugated diene polymer. The manufacturing method for the modified high-cis conjugated diene polymer comprises: performing a polymerization reaction to form a high-cis conjugated diene polymer; and making the high-cis conjugated diene polymer react with a first modifier, and then react with a condensation accelerator and a second modifier to generate a modified high-cis conjugated diene polymer; wherein the modified high-cis conjugated diene polymer has over 97% of cis-1,4 structure. The first modifier comprises a compound represented by the following formula (2).

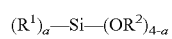  FORMULA (2)

$R^1$ is a functional group comprising a glycidoxy group, 2-(3,4-epoxycyclohexyl) group or an isocyanate group. $R^2$ are substituted or un-substituted $C_1$-$C_3$ alkyl groups. a is 0 or 1. A plurality of $R^2$ may be identical or different.

In an embodiment of the present disclosure, the manufacturing method for the modified high-cis conjugated diene polymer comprises: performing a polymerization reaction to form a high-cis conjugated diene polymer; and making the high-cis conjugated diene polymer react with a first modifier, and then further react with a second modifier through a condensation accelerator to generate a modified high-cis conjugated diene polymer. The modified high-cis conjugated diene polymer has over 97% of cis-1,4 structure.

In other embodiment of the present disclosure, the manufacturing method for the modified high-cis conjugated diene polymer comprises: performing a polymerization reaction to form a high-cis conjugated diene polymer; and making the high-cis conjugated diene polymer react with a first modifier; and then further making an alkoxysilyl functional group remained from the reaction of the high-cis conjugated diene polymer and the first modifier react with a second modifier through a condensation accelerator to generate a modified high-cis conjugated diene polymer. The modified high-cis conjugated diene polymer has over 97% of cis-1,4 structure.

In another embodiment of the present disclosure, the manufacturing method for the modified high-cis conjugated diene polymer comprises: performing a polymerization reaction to form a high-cis conjugated diene polymer; and making a terminal of the high-cis conjugated diene polymer react with a first modifier to remain an alkoxysilyl functional group; and then further making the alkoxysilyl functional group react with an alkoxysilyl functional group of a second modifier through a condensation accelerator to generate a modified high-cis conjugated diene polymer. The modified high-cis conjugated diene polymer has over 97% of cis-1,4 structure.

In embodiments of the present disclosure, a terminal of the high-cis conjugated diene polymer may be an active terminal formed by the reaction of the high cis conjugated diene and a catalyst composition in the polymerization reaction or an alkoxysilyl functional group remained from the reaction of the high-cis conjugated diene polymer and the first modifier.

In embodiments of the present disclosure, a terminal of the high-cis conjugated diene polymer reacts with the first modifier (first stage), and then reacts with the condensation accelerator and the second modifier (second stage). Specifically, during the second stage, an alkoxysilyl functional group of the second modifier can react with an alkoxysilyl functional group of the first modifier in the high-cis conjugated diene polymer remained from the first stage through condensation reaction with the condensation accelerator. As such, the modified high-cis conjugated diene polymer can achieve results of good ageing stability of Mooney viscosity, good dispersibility with white carbon, and good processability. On the contrary, in the second stage, if no alkoxysilyl functional group in the second modifier could react with the alkoxysilyl functional group of the first modifier in the high-cis conjugated diene polymer remained from the first stage through condensation reaction with the condensation accelerator, the modified high-cis conjugated diene polymer would not be modified and achieve the modification effect from the second modifier, and thus the results of good dispersibility with white carbon and good processability could not be achieved.

In the following, the monomers and reagents used in the manufacturing method are disclosed in detail.

<Catalyst Composition>

In an embodiment, the polymerization reaction uses a catalyst composition. The catalyst composition comprises a lanthanide metal organic carboxylate, an organic aluminum compound and a Lewis acid. The organic aluminum compound essentially consists of an aluminum alkyl of a molecular formula of $AlR'_3$ or $HAlR'_2$. R' is a $C_8$-$C_{12}$ hydrocarbon group. The Lewis acid consists of an alkyl aluminum halide.

In an embodiment, the catalyst composition may further comprise a conjugated diene monomer. The conjugated diene monomer may be 1,3-butadiene, isopentadiene (IUPAC nomenclature: 2-methyl-1,3-butadiene), 2-phenyl-1,3-butadiene, 2,3-dimethyl-1,3-butadiene, 1,3-pentadiene, 1,3-hexadiene, 1,3-octadiene, or a combination thereof.

<High-Cis Conjugated Diene Polymer>

In an embodiment, the high-cis conjugated diene polymer is formed by polymerizing conjugated diene monomers. The conjugated diene monomer may comprise 1,3-butadiene, isopentadiene, 2-phenyl-1,3-butadiene, 2,3-dimethyl-1,3-butadiene, 1,3-pentadiene, 1,3-hexadiene, 1,3-octadiene or a combination thereof. The high-cis conjugated diene polymer obtained by the polymerization comprises a conjugated diene structure unit. Here, the "structure unit" or "monomer unit" refers to the structure formed by the polymerization of the conjugated diene monomer mentioned above. The high-cis conjugated diene polymer has over 97% of cis-1,4 structure.

In an embodiment, the conjugated diene structure unit may comprise 1,3-butadiene structure unit, isopentadiene structure unit, 2-phenyl-1,3-butadiene structure unit, 2,3-dimethyl-1,3-butadiene structure unit, 1,3-pentadiene structure unit, 1,3-hexadiene structure unit, 1,3-octadiene structure unit, or a combination thereof.

<First Modifier>

In an embodiment, the first modifier comprises a compound represented by the following formula (2).

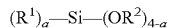 FORMULA (2)

$R^1$ is a functional group comprising a glycidoxy group, 2-(3,4-epoxycyclohexyl) group or an isocyanate group, $R^2$ are substituted or un-substituted $C_1$-$C_3$ alkyl groups, a is 0 or 1, a plurality of $R^2$ may be identical or different. For example, $R^1$ may be 2-glycidoxyethyl group, 3-glycidoxypropyl group, 2-(3,4-epoxycyclohexyl)ethyl group or 3-isocyanatopropyl group, and so on, but is not limited thereto. For example, $R^2$ may be methyl group, ethyl group, n-propyl group or isopropyl group, but is not limited thereto.

In an embodiment, the compound represented by the formula (2) may comprise 2-glycidoxyethyl trimethoxysilane, 2-glycidoxyethyl triethoxysilane, 3-glycidoxypropyl trimethoxysilane, 3-glycidoxypropyl triethoxysilane, 2-(3,4-epoxycyclohexyl)ethyl trimethoxysilane, 2-(3,4-epoxycyclohexyl)ethyl triethoxysilane, 3-isocyanatopropyl trimethoxysilane, 3-isocyanatopropyl triethoxysilane, 3-isocyanatopropyl triisopropoxysilane, tetramethoxysilane, tetraethoxysilane, tetraisopropoxysilane or a combination thereof.

The first modifier may use only one kind of compound, or use a combination of two or more kinds of the compounds.

In an embodiment, the first modifier may use tetramethoxysilane (TMOS) alone.

In an embodiment, the first modifier may use a combination of tetramethoxysilane and 3-glycidoxypropyl trimethoxysilane.

In an embodiment, the first modifier may further comprise bis[3-(trimethoxysilyl)propyl]amine, methyl trimethoxysilane, methyl triethoxysilane, methyl triisopropoxysilane, methyl tri-n-butoxysilane, ethyl trimethoxysilane, ethyl triethoxysilane, ethyl triisopropoxysilane, ethyl tri-n-butoxysilane, n-propyl trimethoxysilane, n-propyl triethoxysilane, n-butyl trimethoxysilane, n-butyl triethoxysilane, n-hexyl trimethoxysilane, n-hexyl triethoxysilane, decyl trimethoxysilane, vinyl trimethoxysilane, vinyl triethoxysilane, phenyl trimethoxysilane, phenyl triethoxysilane, p-hydroxyphenyl trimethoxysilane, 1-(p-hydroxyphenyl)ethyl trimethoxysilane, 2-(p-hydroxyphenyl)ethyl trimethoxysilane, 4-hydroxy-5-(p-hydroxyphenylcarbonyloxy)pentyl trimethoxysilane, trifluoromethyl trimethoxysilane, trifluoromethyl triethoxysilane, 3,3,3-trifluoropropyl trimethoxysilane, 3-aminopropyl trimethoxysilane, 3-aminopropyl triethoxysilane, N,N-dimethyl-3-aminopropyl trimethoxysilane, 3-mercaptopropyl trimethoxysilane, 3-(acryloyloxy)propyl trimethoxysilane, 3-(methacryloyloxy)propyl trimethoxysilane, 3-(methacryloyloxy)propyl triethoxysilane, dimethyl dimethoxysilane, dimethyl diethoxysilane, dimethyl diacetyloxysilane, di-n-butyl dimethoxysilane, diphenyl dimethoxysilane, or a combination thereof.

<Condensation Accelerator>

In an embodiment, the condensation accelerator may comprise a condensation accelerator containing at least one element of a Group 4 element, a Group 12 element, a Group 13 element, a Group 14 element, or a Group 15 element.

In an embodiment, the condensation accelerator comprises a condensation accelerator containing a titanium element, a tin element, a zirconium element, a bismuth element or an aluminum element.

In an embodiment, for example, the condensation accelerator containing a tin element comprises tin(II) n-octanoate, tin(II) 2-ethylhexanoate, tin(II) laurate, tin(II) naphthoate, tin(II) stearate, tin(II) oleate, dibutyltin diacetate, dibutyltin di-n-octanoate, dibutyltin di-2-ethylhexanoate, dibutyltin dilaurate, dibutyltin maleate, dibutyltin bis(benzyl maleate), dibutyltin bis(2-ethylhexylmaleate), di-n-octyl tin diacetate, di-n-octyl tin di-n-octanoate, di-n-octyl tin di-2-ethylhexanoate, di-n-octyl tin dilaurate, di-n-octyl tin maleate, di-n-octyl tin bis(benzyl maleate), or di-n-octyl tin bis(2-ethylhexylmaleate), and so on.

In an embodiment, for example, the condensation accelerator containing a zirconium element comprises zirconium tetraethoxide, zirconium tetra-n-propoxide, zirconium tetra-isopropoxide, zirconium tetra-n-butoxide, zirconium tetra-sec-butoxide, zirconium tetra-tert-butoxide, zirconium tetra-2-ethylhexoxide, zirconium tributoxy stearate, zirconium tributoxy acetyl acetonate, zirconium dibutoxy bis(acetyl acetonate), zirconium tributoxyethylacetoacetate, zirconium butoxide acetylacetonate bis(ethylacetoacetate), zirconium tetra(acetylacetonate), zirconium diacetylacetonate bis(ethylacetoacetate), titanium dibutoxide bis(ethylacetoacetate), titanium tetra(acetylacetonate), titanium diacetylacetonate bis(ethylacetoacetate), bis(2-ethylhexanoate) titanium oxide, bis(laurate) titanium oxide, bis(naphthenate) titanium oxide, bis(stearate) titanium oxide, bis(oleate) titanium oxide, bis(linoleate) titanium oxide, titanium tetra(2-ethylhexanoate), titanium tetralaurate, titanium tetra(naphthenate), titanium tetrakis(stearate), titanium tetrakis(oleate), or titanium tetrakis(linoleate), etc.

<Second Modifier>

The second modifier comprises a compound represented by the formula (1) having the following structure.

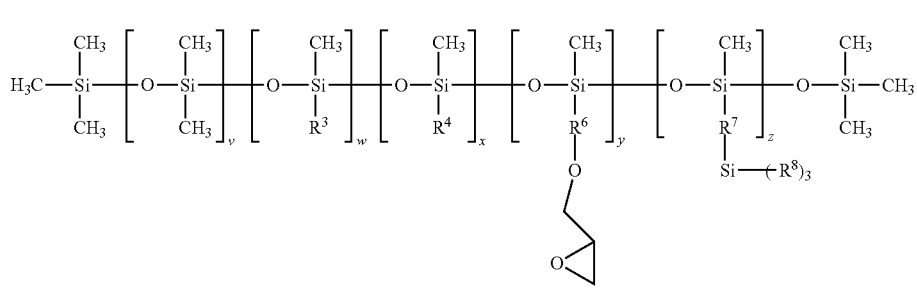

FORMULA (1)

lacetoacetate), bis(2-ethylhexanoate) zirconium oxide, bis(laurate) zirconium oxide, bis(naphthenate) zirconium oxide, bis(stearate) zirconium oxide, bis(oleate) zirconium oxide, bis(linoleate) zirconium oxide, zirconium tetra(2-ethylhexanoate), zirconium tetralaurate, tetra(naphthenate) zirconium, zirconium tetrakis(stearate), zirconium tetrakis(oleate), or zirconium tetrakis(linoleate), etc.

In an embodiment, for example, the condensation accelerator containing a bismuth element comprises bismuth tri(2-ethylhexanoate), bismuth tri(laurate), bismuth tri(naphthenate), bismuth tri(stearate), bismuth tri(oleate), or bismuth tri(linoleate) and so on.

In an embodiment, for example, the condensation accelerator containing an aluminum element comprises aluminum triethoxide, aluminum tri-n-propoxide, aluminum tri-isopropoxide, aluminum tri-n-butoxide, aluminum tri-sec-butoxide, aluminum tri-tert-butoxide, aluminum tri(2-ethylhexoxide), aluminum di-butoxide stearate, aluminum dibutoxide acetylacetonate, aluminum butoxy bis(acetyl acetonate), aluminum dibutoxide ethylacetoacetate, aluminum tri(acetylacetonate), aluminum tri(ethylacetoacetate), aluminum tri(2-ethylhexanoate), aluminum tri(laurate), aluminum tri(naphthenate), aluminum tri(stearate), aluminum tri(oleate), or aluminum tri(linoleate), etc.

In an embodiment, the condensation accelerator containing a titanium element comprises titanium tetramethoxide, titanium tetraethoxide, titanium tetra-n-propoxide, titanium tetra-isopropoxide, titanium tetra-n-butoxide, titanium tetra-n-butoxide oligomer, titanium tetra-sec-butoxide, titanium tetra-tert-butoxide, titanium tetra-2-ethylhexoxide, titanium bis(2-ethylhexoxide) bis(octane dioleate), titanium tetrakis (octane dioleate), titanium lactate, titanium dipropoxybis (triethanolaminate), titanium dibutoxybis(triethanolaminate), titanium tributoxide stearate, titanium tripropoxystearate, titanium tripropoxide acetylacetonate, titanium dipropoxide bis(acetylacetonate), titanium tripropoxide ethylacetoacetate, titanium propoxide acetylacetonate bis(ethylacetoacetate), titanium tributoxy acetyl acetonate, titanium dibutoxide bis(acetylacetonate), titanium tributox- $R^3$ comprise a substituted or un-substituted $C_6$-$C_{16}$ hydrocarbon group containing an aryl group, or a substituted or un-substituted $C_2$-$C_{16}$ hydrocarbon group containing an amino group. $R^4$ comprise a substituted or un-substituted $C_2$-$C_4$ alkylene group, a group of —(O—$C_2H_4$)—, and a group of —$OR^5$. $R^5$ are a hydrogen atom or a substituted or un-substituted $C_1$-$C_3$ alkyl group. $R^6$ are substituted or un-substituted $C_2$-$C_4$ alkylene groups. $R^7$ are substituted or un-substituted $C_2$-$C_4$ alkylene groups. $R^8$ are $C_1$-$C_3$ alkoxy groups. A plurality of $R^3$ may be identical or different. A plurality of $R^4$ may be identical or different. A plurality of $R^5$ may be identical or different. A plurality of $R^6$ may be identical or different. A plurality of $R^7$ may be identical or different. In addition, a plurality of $R^8$ may be identical or different.

For example, the substituted or un-substituted $C_6$-$C_{16}$ hydrocarbon group containing an aryl group has a structure formula of —$C_mH_{2m}$-G. m is 0-4. G is a group comprising an aryl group, and for example is a phenyl group, a 4-methylphenyl group, a 4-ethylphenyl group, a 4-methoxyphenyl group, a 4-propylphenyl group, a 4-n-butylphenyl group, a 4-sec-butylphenyl group, or a 4-tert-butylphenyl group, but is not limited thereto. For example, the substituted or un-substituted $C_2$-$C_{16}$ hydrocarbon group containing an amino group has a structure formula of —$C_qH_{2q}$-J. q is 0-4. J is a group containing an amino group, and for example is a dimethylamino group, a diethylamino group, a dipropylamino group, a di-n-butylamino group, a diisobutylamino group, a bis(trimethylsilyl)amino group, a 1-aziridinyl group, a 1-azetidinyl group, a 1-pyrrolidinyl group, a 1-piperidinyl group, a 1-hexamethyleneimino group, a 1-heptamethyleneimino group, a 1-octamethyleneimino group, a 1-decamethyleneimino group, a 1-dodecamethyleneimino group, a 1-pyrrolyl group, a 1-pyrazolidinyl group, a 1-imidazolidinyl group, a 1-pyrazolyl group, a 1-imidazolyl group, a 4,5-dihydro-1-imidazolyl group, a 1-piperazinyl group or a morpholino group, but is not limited thereto. For example, the substituted or un-substituted $C_2$-$C_4$ alkylene group may be an ethylene group, a propylene group, or a butylene group, but is not limited thereto. For example, the substituted or un-substituted $C_1$-$C_3$ alkyl group may be a methyl group, an ethyl group, a n-propyl group, or an isopropyl group, but is not limited thereto. For example, the $C_1$-$C_3$ alkoxy group may be a methoxy group, an ethoxy group, a n-propoxy group, or an isopropoxy group, but is not limited thereto.

In an embodiment of the present disclosure, $R^4$ are —($C_3H_6$)—(O—$C_2H_4$)$_n$—$OR^5$. $R^5$ are a hydrogen atom or a substituted or un-substituted $C_1$-$C_3$ alkyl group. In addition, n is 1-15, preferably 2-14, or more preferably 2-13. n may be $n_1$ or be $n_2$. In other words, in an embodiment, as $R^5$ is a substituted or un-substituted $C_1$-$C_3$ alkyl group, n is 1-8, preferably 3-7, more preferably 5-6. In an embodiment, for $R^4$ having $R^5$ being a hydrogen atom, n=$n_1$, wherein $n_1$ is 1-7, preferably 2-7, more preferably 2-6; for $R^4$ having $R^5$ being a substituted or un-substituted $C_1$-$C_3$ alkyl group, n=$n_2$, wherein $n_2$ is 1-8, preferably 3-7, more preferably 5-6. In an embodiment, for $R^4$ having $R^5$ being a hydrogen atom, n=$n_1$, wherein $n_1$ is 8-15, preferably 8-14, or more preferably 8-13; for $R^4$ having $R^5$ being a substituted or un-substituted $C_1$-$C_3$ alkyl group, n=$n_2$, wherein $n_2$ is 1-8, preferably 3-7, or more preferably 5-6.

In an embodiment, the compound represented by the formula (1) has a weight-average molecular weight of about 40,000. v is 170-400, preferably 190-380, more preferably 210-360. w is 0-45, preferably 0-35, more preferably 0-25. x is 0-71, preferably 0-65, more preferably 0-59. y is 0-43, preferably 0-38, more preferably 0-33. z is 5-34, preferably 5-29, more preferably 10-24. A total of w, x and y is bigger than 0.

Structure units having $R^4$ of different functional groups may have individual numbers of repeating structure units. For example, x may be represented with various numbers of repeating structure units having $R^4$ of different functional groups, such as $x_1$, $x_2$, $x_3$ . . . , and x=$x_1$+$x_2$+$x_3$ . . . , and so on. In other words, in an embodiment, a corresponding symbol of x for a structure unit having $R^4$ being —($C_3H_6$)—(O—$C_2H_4$)$_n$—$OR^5$ with $R^5$ being a hydrogen atom is $x_1$, wherein $x_1$ is 10-38, preferably 15-33, more preferably 20-28. In an embodiment, a corresponding symbol of x for a structure unit having $R^4$ being —($C_3H_6$)—(O—$C_2H_4$)$_n$—$OR^5$ with $R^5$ being a substituted or un-substituted $C_1$-$C_3$ alkyl group is $x_2$, wherein $x_2$ is 10-38, preferably 15-33, more preferably 20-28. In an embodiment, a structure unit having $R^4$ being —($C_3H_6$)—(O—$C_2H_4$)$_n$—$OR^5$ with $R^5$ being a hydrogen atom has a number of $x_1$ being 20-28, and has n=$n_1$ being 2-6; a structure unit having $R^4$ being —($C_3H_6$)—(O—$C_2H_4$)$_n$—$OR^5$ with $R^5$ being a substituted or un-substituted $C_1$-$C_3$ alkyl group has a number of $x_2$ being 20-28, and has n=$n_2$ being 5-6. In an embodiment, a structure unit having $R^4$ being —($C_3H_6$)—(O—$C_2H_4$)$_n$—$OR^5$ with $R^5$ being a hydrogen atom has a number of $x_1$ being 20-28, and has n=$n_1$ being 8-13; a structure unit having $R^4$ being —($C_3H_6$)—(O—$C_2H_4$)$_n$—$OR^5$ with $R^5$ being a substituted or un-substituted $C_1$-$C_3$ alkyl group has a number of $x_2$ being 20-28, and has n=$n_2$ being 5-6.

In an embodiment, the second modifier may be a compound represented by a formula (1-1) having the following structure.

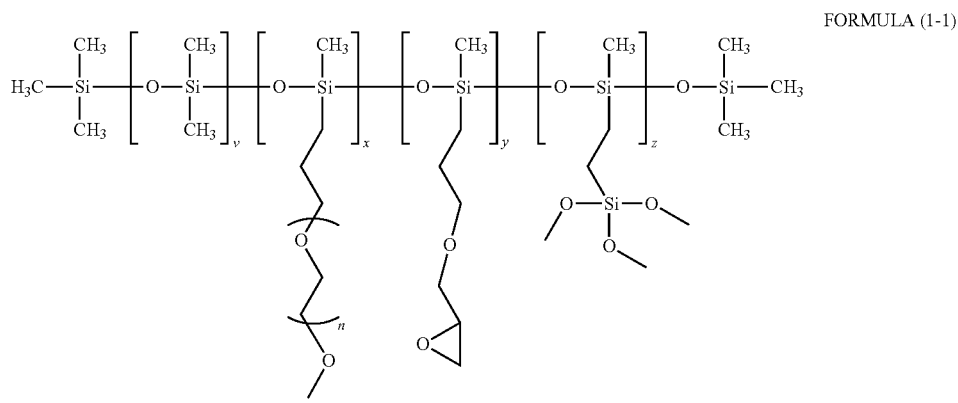

FORMULA (1-1)

In an embodiment, the compound represented by the formula (1) has a weight-average molecular weight of about 40,000. v is 170-400, preferably 190-380, more preferably 210-360. w is 0-45, preferably 0-35, more preferably 0-25. y is 0-43, preferably 0-38, and more preferably 0-33. z is 5-34, preferably 5-29, more preferably 10-24. Moreover, x is 5-71, preferably 10-65, more preferably 15-59.

The compound represented by the formula (1-1) shown above has a weight-average molecular weight of about 40,000. v is 220-350. x is 20-28. y is 20-28. z is 10-14. n is 5-6 (a molecular weight of a polyethylene oxide functional group is about 350).

In an embodiment, the second modifier may be a compound represented by a formula (1-2) having the following structure.

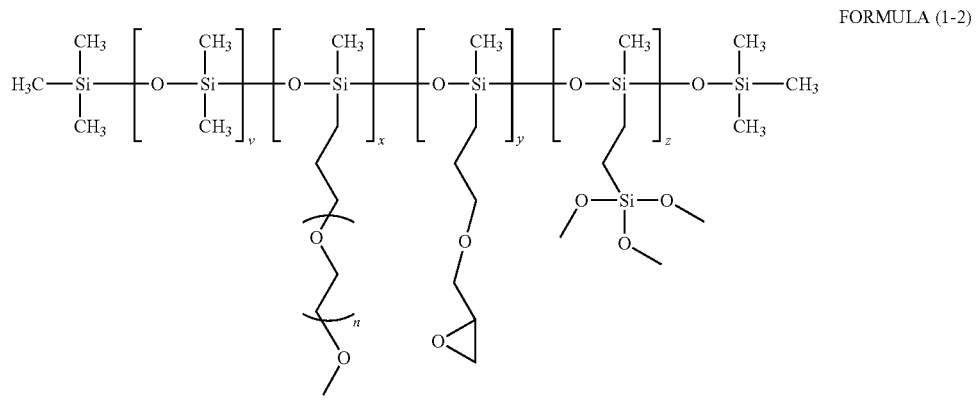

FORMULA (1-2)

The compound represented by the formula (1-2) shown above has a weight-average molecular weight of about 40,000. v is 220-350. x is 18-25. y is 18-25. z is 15-21. n is 5-6 (a molecular weight of a polyethylene oxide functional group is about 350).

In an embodiment, the second modifier may be a compound represented by a formula (1-3) having the following structure.

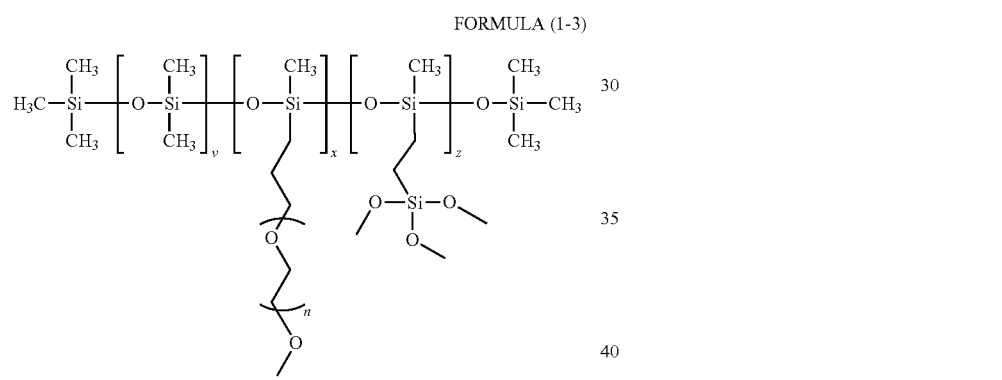

FORMULA (1-3)

The compound represented by the formula (1-3) shown above has a weight-average molecular weight of about 40,000. v is 220-350. x is 40-56. z is 10-14. n is 5-6 (a molecular weight of a polyethylene oxide functional group is about 350).

In an embodiment, the second modifier may be a compound represented by a formula (1-4) having the following structure.

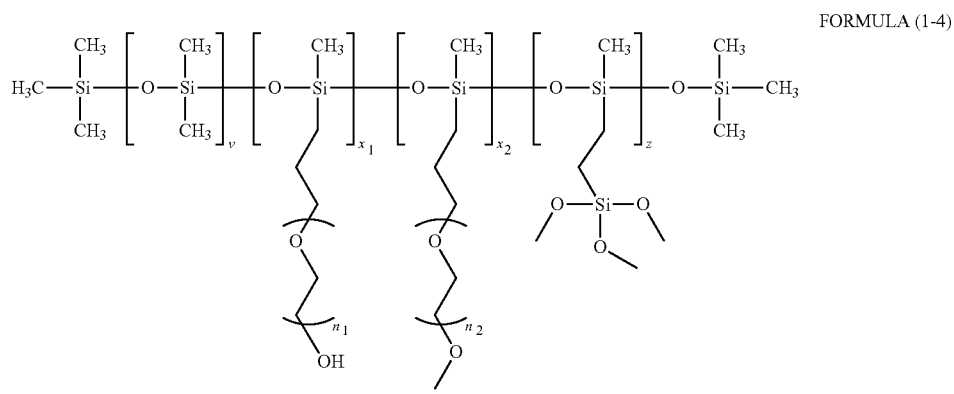

FORMULA (1-4)

The compound represented by formula (1-4) shown above has a weight-average molecular weight of about 40,000. v is 220-350. $x_1$ is 20-28. $x_2$ is 20-28. z is 10-14. $n_1$ is 8-13 (a molecular weight of a polyethylene oxide functional group is about 480). $n_2$ is 5-6 (a molecular weight of a polyethylene oxide functional group is about 350). In an embodiment, $x_1+x_2=x$.

In an embodiment, the second modifier may be a compound represented by a formula (1-5) having the following structure.

FORMULA (1-5)

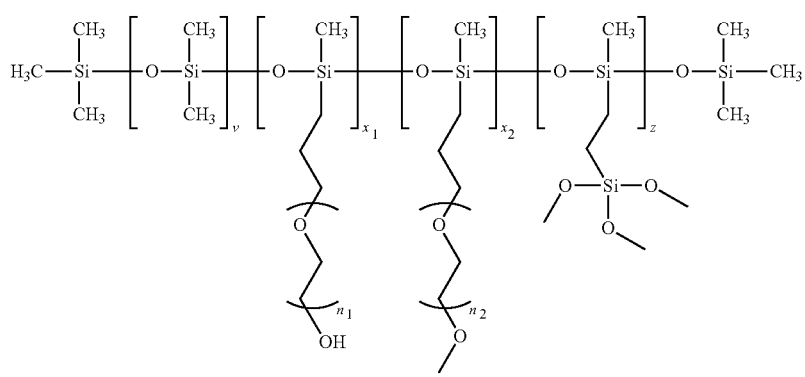

The compound represented by the formula (1-5) shown above has a weight-average molecular weight of about 40,000. v is 220-350. $x_1$ is 20-28. $x_2$ is 20-28. z is 10-14. $n_1$ is 2-6 (a molecular weight of a polyethylene oxide functional group is about 250). $n_2$ is 5-6 (a molecular weight of a polyethylene oxide functional group is about 350). In an embodiment, $x_1+x_2=x$.

In an embodiment, the second modifier may further comprise bis[3-(trimethoxysilyl)propyl]amine, tetramethoxysilane, tetraethoxysilane, tetraisopropoxysilane, 2-glycidoxyethyl trimethoxysilane, 2-glycidoxyethyl triethoxysilane, 3-glycidoxypropyl trimethoxysilane, 3-glycidoxypropyl triethoxysilane, 2-(3,4-epoxycyclohexyl)ethyl trimethoxysilane, 2-(3,4-epoxycyclohexyl)ethyl triethoxysilane, 3-isocyanatopropyl trimethoxysilane, 3-isocyanatopropyl triethoxysilane, 3-isocyanatopropyl triisopropoxysilane, methyl trimethoxysilane, methyl triethoxysilane, methyl triisopropoxysilane, methyl tri-n-butoxysilane, ethyl trimethoxysilane, ethyl triethoxysilane, ethyl triisopropoxysilane, ethyl tri-n-butoxysilane, n-propyl trimethoxysilane, n-propyl triethoxysilane, n-butyl trimethoxysilane, n-butyl triethoxysilane, n-hexyl trimethoxysilane, n-hexyl triethoxysilane, decyl trimethoxysilane, vinyl trimethoxysilane, vinyl triethoxysilane, phenyl trimethoxysilane, phenyl triethoxysilane, p-hydroxyphenyl trimethoxysilane, 1-(p-hydroxyphenyl)ethyl trimethoxysilane, 2-(p-hydroxyphenyl)ethyl trimethoxysilane, 4-hydroxy-5-(p-hydroxyphenylcarbonyloxy)pentyl trimethoxysilane, trifluoromethyl trimethoxysilane, trifluoromethyl triethoxysilane, 3,3,3-trifluoropropyl trimethoxysilane, 3-aminopropyl trimethoxysilane, 3-aminopropyl triethoxysilane, N,N-dimethyl-3-aminopropyl trimethoxysilane, 3-mercaptopropyl trimethoxysilane, 3-(acryloyloxy)propyl trimethoxysilane, 3-(methacryloyloxy)propyl trimethoxysilane, 3-(methacryloyloxy)propyl triethoxysilane, dimethyl dimethoxysilane, dimethyl diethoxysilane, dimethyl diacetyloxysilane, di-n-butyl dimethoxysilane, diphenyl dimethoxysilane, trimethyl methoxysilane, tri-n-butyl ethoxysilane, or a combination thereof.

<Solvent>

In an embodiment, the polymerization reaction may be performed in a solvent. The solvent may comprise a non-polar solvent, for example aliphatic hydrocarbon such as pentane, hexane, heptane, etc.; an alicyclic hydrocarbon such as cyclopentane, cyclohexane, methylcyclopentane, methylcyclohexane, etc.; an aromatic hydrocarbon such as benzene, methylbenzene, dimethylbenzene, etc.; or a mixture of which, but is not limited thereto.

The present disclosure also provides a modified high-cis conjugated diene polymer generated by performing a polymerization reaction to form a high-cis conjugated diene polymer, and make the high-cis conjugated diene polymer react with a first modifier, and then react with a condensation accelerator and a second modifier. The modified high-cis conjugated diene polymer has over 97% of cis-1,4 structure.

The first modifier comprises a compound represented by the following formula (2).

$$(R^1)_a-Si-(OR^2)_{4-a} \qquad \text{FORMULA (2)}$$

$R^1$ is a functional group comprising a glycidoxy group, 2-(3,4-epoxycyclohexyl) group or an isocyanate group. $R^2$ are substituted or un-substituted $C_1$-$C_3$ alkyl groups. a is 0 or 1. A plurality of $R^2$ may be identical or different.

The second modifier comprises a compound represented by the formula (1).

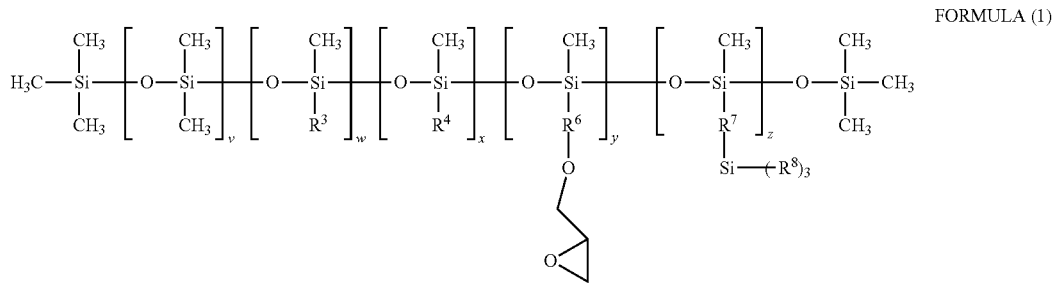

FORMULA (1)

$R^3$ are a substituted or un-substituted $C_6$-$C_{16}$ hydrocarbon group containing an aryl group, or a substituted or un-substituted $C_2$-$C_{16}$ hydrocarbon group containing an amino group. $R^4$ comprise a substituted or un-substituted $C_2$-$C_4$ alkylene group, a group of —(O—$C_2H_4$)—, and a group of —$OR^5$. $R^5$ are a hydrogen atom or a substituted or un-substituted $C_1$-$C_3$ alkyl group. $R^6$ are substituted or un-substituted $C_2$-$C_4$ alkylene groups. $R^7$ are substituted or un-substituted $C_2$-$C_4$ alkylene groups. $R^8$ are $C_1$-$C_3$ alkoxy groups. v is 170-400. w is 0-45. x is 0-71. y is 0-43. z is 5-34. In addition, a total of w, x and y is bigger than 0. A plurality of $R^3$ may be identical or different. A plurality of $R^4$ may be identical or different. A plurality of $R^5$ may be identical or different. A plurality of $R^6$ may be identical or different. A plurality of $R^7$ may be identical or different. Moreover, a plurality of $R^8$ may be identical or different.

The present disclosure also provides a modified high-cis conjugated diene polymer comprising a polymer represented by the formula (3) having the following structure.

plurality of $R^3$ may be identical or different. A plurality of $R^4$ may be identical or different. A plurality of $R^5$ may be identical or different. A plurality of $R^6$ may be identical or different. A plurality of $R^7$ may be identical or different. Moreover, a plurality of $R^8$ may be identical or different.

In an embodiment, in the polymer represented by the formula (3), a functional group $R^2$ of a group —$OR^2$ may be identical substituted or un-substituted $C_1$-$C_3$ alkyl group as before the reaction, or may be a hydrogen atom obtained by a conversion through a high temperature steam stripping after the reaction. Therefore, $R^2$ may be substituted or un-substituted $C_1$-$C_3$ alkyl groups or a hydrogen atom. A functional group $R^8$ may be identical $C_1$-$C_3$ alkoxy group as before the reaction, or may be a hydroxyl group obtained by a conversion through a high temperature steam stripping after the reaction. Therefore, $R^8$ may be a $C_1$-$C_3$ alkoxy group or a hydroxyl group.

In an embodiment, in the polymer represented by the formula (3), $R^4$ are —($C_3H_6$)—(O—$C_2H_4$)$_n$—$OR^5$. $R^5$ are a

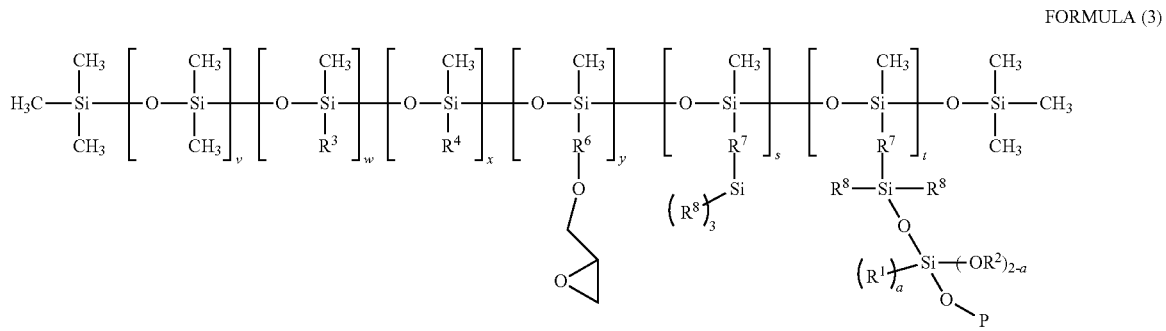

FORMULA (3)

$R^1$ is a functional group comprising a glycidoxy group, 2-(3,4-epoxycyclohexyl) group or an isocyanate group. $R^2$ are substituted or un-substituted $C_1$-$C_3$ alkyl groups or a hydrogen atom. a is 0 or 1. $R^3$ comprise a substituted or un-substituted $C_6$-$C_{16}$ hydrocarbon group containing an aryl group, or a substituted or un-substituted $C_2$-$C_{16}$ hydrocarbon group containing an amino group. $R^4$ comprise a substituted or un-substituted $C_2$-$C_4$ alkylene group, a group of —(O—$C_2H_4$)—, and a group of —$OR^5$. $R^5$ are a hydrogen atom or a substituted or un-substituted $C_1$-$C_3$ alkyl group. $R^6$ are substituted or un-substituted $C_2$-$C_4$ alkylene groups. $R^7$ are substituted or un-substituted $C_2$-$C_4$ alkylene groups. $R^8$ are $C_1$-$C_3$ alkoxy group or hydroxy group. P is a conjugated diene polymer having over 97% of cis-1,4 structure. v is 170-400. w is 0-45. x is 0-71. y is 0-43. In addition, a total of w, x and y is bigger than 0. t is 1-34. z=t+s. Moreover, z is 5-34. A plurality of $R^2$ may be identical or different. A hydrogen atom or a substituted or un-substituted $C_1$-$C_3$ alkyl group. In addition, n is 1-15, preferably 2-14, or more preferably 2-13. n may be $n_1$ or be $n_2$. In other words, in an embodiment, as $R^5$ is a substituted or un-substituted $C_1$-$C_3$ alkyl group, n is 1-8, preferably 3-7, more preferably 5-6. In an embodiment, for $R^4$ having $R^5$ being a hydrogen atom, n=$n_1$, wherein $n_1$ is 1-7, preferably 2-7, more preferably 2-6; for $R^4$ having $R^5$ being a substituted or un-substituted $C_1$-$C_3$ alkyl group, n=$n_2$, wherein $n_2$ is 1-8, preferably 3-7, more preferably 5-6. In an embodiment, for $R^4$ having $R^5$ being a hydrogen atom, n=$n_1$, wherein $n_1$ is 8-15, preferably 8-14, or more preferably 8-13; for $R^4$ having $R^5$ being a substituted or un-substituted $C_1$-$C_3$ alkyl group, n=$n_2$, wherein $n_2$ is 1-8, preferably 3-7, or more preferably 5-6.

In an embodiment, for the polymer represented by the formula (3), v is 170-400, preferably 190-380, more preferably 210-360. w is 0-45, preferably 0-35, more preferably 0-25. x is 0-71, preferably 0-65, more preferably 0-59. y is 0-43, preferably 0-38, more preferably 0-33. z=t+s. z is 5-34, preferably 5-29, more preferably 10-24. t is 1-34, preferably 1-29, more preferably 1-24. A total of w, x and y is bigger than 0.

In an embodiment, in the polymer represented by the formula (3), a corresponding symbol of x for a structure unit having $R^4$ being —$(C_3H_6)$—$(O$—$C_2H_4)_n$—$OR^5$ with $R^5$ being a hydrogen atom is wherein $x_1$ is 10-38, preferably 15-33, more preferably 20-28. In an embodiment, a corresponding symbol of x for a structure unit having $R^4$ being —$(C_3H_6)$—$(O$—$C_2H_4)_n$—$OR^5$ with $R^5$ being a substituted or un-substituted $C_1$-$C_3$ alkyl group is $x_2$, wherein $x_2$ is 10-38, preferably 15-33, more preferably 20-28. In an embodiment, a structure unit having $R^4$ being —$(C_3H_6)$—$(O$—$C_2H_4)_n$—$OR^5$ with $R^5$ being a hydrogen atom has a number of $x_1$ being 20-28, and has n=$n_1$ being 2-6; a structure unit having $R^4$ being —$(C_3H_6)$—$(O$—$C_2H_4)_n$—$OR^5$ with $R^5$ being a substituted or un-substituted $C_1$-$C_3$ alkyl group has a number of $x_2$ being 20-28, and has n=$n_2$ being 5-6. In an embodiment, a structure unit having $R^4$ being —$(C_3H_6)$—$(O$—$C_2H_4)_n$—$OR^5$ with $R^5$ being a hydrogen atom has a number of $x_1$ being 20-28, and has n=$n_1$ being 8-13; a structure unit having $R^4$ being —$(C_3H_6)$—$(O$—$C_2H_4)_n$—$OR^5$ with $R^5$ being a substituted or un-substituted $C_1$-$C_3$ alkyl group has a number of $x_2$ being 20-28, and has n=$n_2$ being 5-6.

In an embodiment, the conjugated diene polymer is formed by polymerizing conjugated diene monomers. The conjugated diene monomer may comprise 1,3-butadiene, isopentadiene, 2-phenyl-1,3-butadiene, 2,3-dimethyl-1,3-butadiene, 1,3-pentadiene, 1,3-hexadiene, 1,3-octadiene or a combination thereof. The conjugated diene polymer obtained by the polymerization comprises a conjugated diene structure unit. The referred to as "structure unit" or "monomer unit" means a structure formed by the polymerization of the conjugated diene monomer mentioned above. The conjugated diene polymer has over 97% of cis-1,4 structure.

In an embodiment, the conjugated diene structure unit may comprise 1,3-butadiene structure unit, isopentadiene structure unit, 2-phenyl-1,3-butadiene structure unit, 2,3-dimethyl-1,3-butadiene structure unit, 1,3-pentadiene structure unit, 1,3-hexadiene structure unit, 1,3-octadiene structure unit, or a combination thereof.

In an embodiment, the present disclosure also provides a rubber composition, comprising carbon black, white carbon and the modified high-cis conjugated diene polymer disclosed above.

In an embodiment, the present disclosure also provides a tire, comprising the rubber composition disclosed above.

Embodiment

<Preparation of Second Modifier>
<Compound Represented by Formula (1-1)>

Hexane of 2025 g, polymethylhydrosiloxane (PMHS, having a weight-average molecular weight of about 24,000 and a hydrogen content of about 0.3%) of 675 g, polyethylene glycol allyl methyl ether of 283.5 g, allyl glycidyl ether of 92.46 g and vinyl trimethoxysilane of 60.02 g were added into a three-necked flask, and then stirred and heated to 60° C.-70° C. Next, a proper amount of Pt catalyst was added, and a reaction was performed for 6 hours. A distillation was performed for 1 hour. Then, the reaction mixture was discharged and cooled down to the room temperature. A solution having 20% of the second modifier was obtained by adjusting a concentration of the second modifier in the solution with using hexane. The obtained second modifier is the compound represented by the formula (1-1) having the weight-average molecular weight of about 40,000, with v being 220-350, x being 20-28, y being 20-28, z being 10-14, n being 5-6 (a molecular weight of a polyethylene oxide functional group is about 350). The compound represented by the formula (1-1) may be regarded as a modified polymethylhydrosiloxane obtained by modifying polymethylhydrosiloxane as a raw material.

<Compound Represented by Formula (1-2)>

Hexane of 2025 g, polymethylhydrosiloxane (PMHS, having a weight-average molecular weight of about 24,000 and a hydrogen content of about 0.3%) of 675 g, polyethylene glycol allyl methyl ether of 248.1, allyl glycidyl ether of 80.90 g and vinyl trimethoxysilane of 90.03 g were added into a three-necked flask, and then stirred and heated to 60° C.-70° C. Next, a proper amount of Pt catalyst was added, and a reaction was performed for 6 hours. A distillation was performed for 1 hour. Then, the reaction mixture was discharged and cooled down to the room temperature. A solution having 20% of the second modifier was obtained by adjusting a concentration of the second modifier in the solution with using hexane. The obtained second modifier is the compound represented by the formula (1-2) having the weight-average molecular weight of about 40,000, with v being 220-350, x being 18-25, y being 18-25, z being 15-21, n being 5-6 (a molecular weight of a polyethylene oxide functional group is about 350). The compound represented by the formula (1-2) may be regarded as a modified polymethylhydrosiloxane obtained by modifying polymethylhydrosiloxane as a raw material.

<Compound Represented by Formula (1-3)>

Hexane of 2025 g, polymethylhydrosiloxane (PMHS, having a weight-average molecular weight of about 24,000 and a hydrogen content of about 0.3%) of 675 g, polyethylene glycol allyl methyl ether of 567.0 g, and vinyl trimethoxysilane of 60.02 g were added into a three-necked flask, and then stirred and heated to 60° C.-70° C. Next, a proper amount of Pt catalyst was added, and a reaction was performed for 6 hours. A distillation was performed for 1 hour. Then, the reaction mixture was discharged and cooled down to the room temperature. A solution having 20% of the second modifier was obtained by adjusting a concentration of the second modifier in the solution with using hexane. The obtained second modifier is the compound represented by the formula (1-3) having the weight-average molecular weight of about 40,000, with v being 220-350, x being 40-56, z being 10-14, n being 5-6 (a molecular weight of a polyethylene oxide functional group is about 350). The compound represented by the formula (1-3) may be regarded as a modified polymethylhydrosiloxane obtained by modifying polymethylhydrosiloxane as a raw material.

<Compound Represented by Formula (1-4)>

Hexane of 1020 g, polymethylhydrosiloxane (PMHS, having a weight-average molecular weight of about 24,000 and a hydrogen content of about 0.3%) of 675 g, polyethylene glycol allyl methyl ether of 142.8 g, allyl alcohol ethoxylate of 207.1 g and vinyl trimethoxysilane of 30.23 g were added into a three-necked flask, and then stirred and heated to 60° C.-70° C. Next, a proper amount of Pt catalyst was added, and a reaction was performed for 6 hours. A distillation was performed for 1 hour. Then, the reaction mixture was discharged and cooled down to the room temperature. A solution having 20% of the second modifier was obtained by adjusting a concentration of the second modifier in the solution with using hexane. The obtained second modifier is the compound represented by the formula (1-4) having the weight-average molecular weight of about 40,000, with v being 220-350, $x_1$ being 20-28, $x_2$ being 20-28, z being 10-14, $n_1$ being 8-13 (a molecular weight of a polyethylene oxide functional group is about 480), and $n_2$ being 5-6 (a molecular weight of a polyethylene oxide functional group is about 350). The compound represented by the formula (1-4) may be regarded as a modified polymethylhydrosiloxane obtained by modifying polymethylhydrosiloxane as a raw material.

<Compound Represented by Formula (1-5)>

Hexane of 1020 g, polymethylhydrosiloxane (PMHS, having a weight-average molecular weight of about 24,000 and a hydrogen content of about 0.3%) of 675 g, polyethylene glycol allyl methyl ether of 142.8 g, allyl alcohol ethoxylate of 102.0 g and vinyl trimethoxysilane of 30.23 g were added into a three-necked flask, and then stirred and heated to 60° C.-70° C. Next, a proper amount of Pt catalyst was added, and a reaction was performed for 6 hours. A distillation was performed for 1 hour. Then, the reaction mixture was discharged and cooled down to the room temperature. A solution having 20% of the second modifier was obtained by adjusting a concentration of the second modifier in the solution with using hexane. The obtained second modifier is the compound represented by the formula (1-5) having the weight-average molecular weight of about 40,000, with v being 220-350, $x_1$ being 20-28, $x_2$ being 20-28, z being 10-14, $n_1$ being 2-6 (a molecular weight of a polyethylene oxide functional group is about 250), and $n_2$ being 5-6 (a molecular weight of a polyethylene oxide functional group is about 350). The compound represented by the formula (1-5) may be regarded as a modified polymethylhydrosiloxane obtained by modifying polymethylhydrosiloxane as a raw material.

<Preparation of Catalyst Composition>

The catalyst composition was a mixture of 0.162 moles of neodymium neodecanoate, 1.296 moles of diisobutylaluminium hydride (DIBAH) and 0.486 moles of diethylaluminum chloride (DEAC) with using hexane as a solvent in the room temperature. In the catalyst composition, neodymium (Nd) element accounts for 0.26 wt %; the number of moles of neodymium neodecanoate: the number of moles of the sum of DEAC and DIBAH is 1:11; and the number of moles of neodymium neodecanoate: the number of moles of DEAC was controlled at 1:3.

<Preparation of Modified High-Cis Conjugated Diene Polymer>

Embodiment 1

60 kg of n-hexane was injected into a reaction tank, and the reaction tank was heated with a set temperature of 60° C. Then, after 9 kg of 1,3-butadiene was measured and injected into the reaction tank, 2 kg of n-hexane was injected into the reaction tank. Next, 900 g of the catalyst composition obtained in the step of <PREPARATION OF CATALYST COMPOSITION> disclosed above (with Nd 0.26 wt %) was measured and injected into the reaction tank. After the reaction tank reached the maximum temperature (60° C.), 115 g of the first modifier TMOS (concentration 10% with n-hexane as a solvent) were measured and injected into the reaction tank. After a reaction time of about 5 minutes, 110 g of tin(II) 2-ethylhexanoate as the condensation accelerator (concentration 10% with n-hexane as a solvent) and 225 g of the compound represented by the formula (1-1) manufactured in the step of <PREPARATION OF SECOND MODIFIER> disclosed above (concentration 20% with n-hexane as a solvent was added. After stirring for about 30 minutes, the reaction mixture was discharged to obtain the modified high-cis conjugated diene polymer. The modified high-cis conjugated diene polymer having a cis-1,4 structure content of 98% was measured by comparing with a standard sample for absorption value of infrared (740 cm$^{-1}$).

Comparative Example 1

The modified high-cis conjugated diene polymer in comparative example 1 was prepared with steps similar as those in embodiment 1 with difference only in using a compound represented by the following the formula (4-1) as the second modifier.

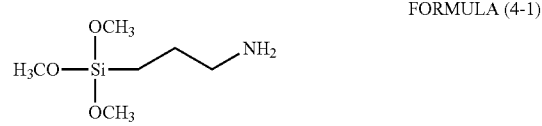 [SMILES: CO[Si](CCCN)(OC)OC]

FORMULA (4-1)

Comparative Example 2

The modified high-cis conjugated diene polymer in comparative example 2 was prepared with steps similar as those in embodiment 1 with difference only in using a compound represented by the following formula (4-2) as the second modifier.

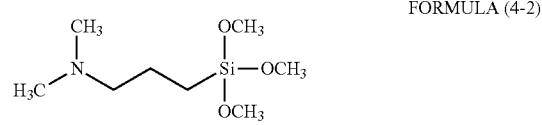

FORMULA (4-2)

Comparative Example 3

The modified high-cis conjugated diene polymer in comparative example 3 was prepared with steps similar as those in embodiment 1 with difference only in no reaction performance of the second stage using the condensation accelerator and the second modifier.

Table 1 shows usage amount of the second modifier and property in embodiment 1 and comparative examples 1-3.

TABLE 1

| | embodiment 1 | comparative example 1 | comparative example 2 | comparative example 3 |
|---|---|---|---|---|
| second modifier | formula (1-1) | formula (4-1) | formula (4-2) | none |
| usage amount (g) | 225 | 81 | 110 | 0 |
| ΔML (10 days) | 1.3 | 9.3 | 2.8 | 8.4 |

The item "ΔML (10 days)" in table 1 was a difference value of Mooney viscosity obtained by measuring a Mooney viscosity (M0) of the modified high-cis conjugated diene polymer as synthesized, measuring a Mooney viscosity (M10) of the modified high-cis conjugated diene polymer after being disposed in an oven with a temperature of 80° C. and a humidity of 80% for 10 days, and then subtracting M0 from M10. The larger value in the item "ΔML 10 days" means the weaker ageing stability of Mooney viscosity. Mooney viscosity was measured by using the machine of model MV-2000 of Alpha Technology company according to ASTM D-1646 method with a measuring temperature of 100° C. and a measuring time of 1+4 minutes.

Embodiment 2

60 kg of n-hexane was injected into a reaction tank, and the reaction tank was heated with a set temperature of 60° C. Then, after 9 kg of 1,3-butadiene was measured and injected into the reaction tank, 2 kg of n-hexane was injected into the reaction tank. Next, 900 g of the catalyst composition obtained in the step of <PREPARATION OF CATALYST COMPOSITION> disclosed above (with Nd 0.26 wt %) was measured and injected into the reaction tank. After the reaction tank reached the maximum temperature (60° C.), 21 g of the first modifier TMOS (concentration 20% with n-hexane as a solvent) and 62 g of 3-glycidoxypropyl trimethoxysilane (trade name: KBM-403) (concentration 20% with n-hexane as a solvent) were measured and injected into the reaction tank. After a reaction time of about 5 minutes, 110 g of tin(II) 2-ethylhexanoate as the condensation accelerator (concentration 10% with n-hexane as a solvent) and 270 g of the compound represented by the formula (1-1) as the second modifier manufactured in the step of <PREPARATION OF SECOND MODIFIER> disclosed above (concentration 20% with n-hexane as a solvent) was added. After stirring for about 30 minutes, the reaction mixture was discharged to obtain the modified high-cis conjugated diene polymer. The modified high-cis conjugated diene polymer having a cis-1,4 structure content of 98% was measured by comparing with a standard sample for absorption value of infrared (740 $cm^{-1}$).

Embodiment 3

The modified high-cis conjugated diene polymer in embodiment 3 was prepared with steps similar as those in embodiment 2 with difference only in using the compound represented by the formula (1-2) as the second modifier.

Embodiment 4

The modified high-cis conjugated diene polymer in embodiment 4 was prepared with steps similar as those in embodiment 2 with difference only in using the compound represented by the formula (1-3) as the second modifier.

Embodiment 5

The modified high-cis conjugated diene polymer in embodiment 5 was prepared with steps similar as those in embodiment 2 with difference only in using the compound represented by the formula (1-4) as the second modifier.

Embodiment 6

The modified high-cis conjugated diene polymer in embodiment 6 was prepared with steps similar as those in embodiment 2 with difference only in using the compound represented by the formula (1-5) as the second modifier.

Comparative Example 4

The modified high-cis conjugated diene polymer in comparative example 4 was prepared with steps similar as those in embodiment 2 with difference only in using a compound represented by the following formula (4-3) as the second modifier.

FORMULA (4-3)

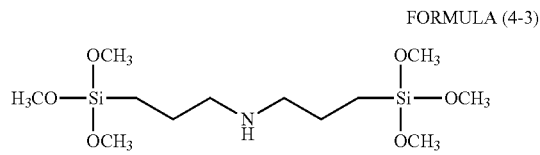

Table 2 shows usage amount of the second modifier and property in embodiments 2 to 4 and comparative example 4.

TABLE 2

|  | embodiment 2 | embodiment 3 | embodiment 4 | comparative example 4 |
| --- | --- | --- | --- | --- |
| second modifier | formula (1-1) | formula (1-2) | formula (1-3) | formula (4-3) |
| usage amount (g) | 270 | 270 | 270 | 92 |
| ΔML (10 days) | 1.4 | 1.4 | 0.8 | 4.9 |

Comparative Example 5

The high-cis conjugated diene polymer in comparative example 5 was prepared with steps similar as those in embodiment 2 with difference only in no reaction performance of the second stage using the condensation accelerator and the second modifier.

The following table 3 shows properties of embodiments 2 to 3 and comparative example 5. Evaluation method for the lamination property to scroll wheel and the Garvey die will disclosed below.

TABLE 3

|  |  | embodiment 2 | embodiment 3 | comparative example 5 |
| --- | --- | --- | --- | --- |
| second modifier |  | formula (1-1) | formula (1-2) | — |
| lamination property to scroll wheel | 26 rpm/29 rpm 1 mm | ○ | ○ | X |
|  | 26 rpm/29 rpm 2 mm | ○ | ○ | X |
| Garvey die | 50 rpm edge | 7 | 7 | 3 |
|  | surface appearance | A | A | C |
|  | 80 rpm edge | 7 | 7 | 3 |
|  | surface appearance | A | A | C |
|  | 120 rpm edge | 7 | 7 | 3 |
|  | surface appearance | A | A | C |

<Preparation of Conjugated Diene-Vinyl Aromatic Hydrocarbon Copolymer (SSBR)>
<Conjugated Diene-Vinyl Aromatic Hydrocarbon Copolymer (SSBR-1)>

800 g of cyclohexane as a solvent was added into a reaction tank, and a temperature of the reaction system was maintained in 45° C. Then 0.64 g of 2,2-di(2-tetrahydrofuryl)propane (DTHFP) as a microstructure adjuster was added in the reaction tank. Next, 0.08 g of n-butyl lithium as an initiator for polymerization reaction was added in the reaction tank. Next, 59.6 g of styrene used as a vinyl aromatic hydrocarbon monomer and 153.4 g of 1,3-butadiene used as a conjugated diene monomer were added in the reaction tank to perform a polymerization reaction. Next, 7.46 g of 1,3-butadiene was added to react. After the reaction, cyclohexane was removed by using hot water. After a drying step, a conjugated diene-vinyl aromatic hydrocarbon copolymer (SSBR-1) was obtained.

<Conjugated Diene-Vinyl Aromatic Hydrocarbon Copolymer (SSBR-2)>

800 g of cyclohexane as a solvent was added into a reaction tank, and a temperature of the reaction system was maintained in 45° C. Then 0.64 g of 2,2-di(2-tetrahydrofuryl)propane (DTHFP) as a microstructure adjuster was added in the reaction tank. Next, 0.08 g of n-butyl lithium as an initiator for polymerization reaction was added in the reaction tank. Next, 44.7 g of styrene used as a vinyl aromatic hydrocarbon monomer and 168.3 g of 1,3-butadiene used as a conjugated diene monomer were added in the reaction tank to perform a polymerization reaction. Next, 7.46 g of 1,3-butadiene was added to react. After the reaction, cyclohexane was removed by using hot water. After a drying step, a conjugated diene-vinyl aromatic hydrocarbon copolymer (SSBR-2) was obtained.

<Preparation of Rubber Composition>
<Rubber Composition (1)>

20 parts by weight of the modified high-cis conjugated diene polymer in embodiment 2 disclosed above, 80 parts by weight of the conjugated diene-vinyl aromatic hydrocarbon copolymer (SSBR-1) disclosed above, and materials disclosed below were milled in a Banbury type mixer. 85 parts by weight of white carbon, 30 parts by weight of oil, 1 part by weight of an antioxidant, 5 parts by weight of carbon black, 2 parts by weight of zinc oxide, and 1 part by weight of steric acid were added to mix. As a temperature was heated up to 150° C., a gel mixture was discharged. Then the gel mixture was aged for 24 hours. 1.8 parts by weight of CBS, 1.7 parts by weight of DPG, and 1.7 parts by weight of sulfur were added to the discharged gel mixture in a roller mixer for performing a vulcanization to obtain a rubber composition. The material information used in the preparation of the rubber composition is as follows:
  a. White carbon (silica, 7000GR, made by ULTRASIL EVONIK)
  b. Oil (treated distillate aromatic extract (TDAE), Vivtec 500, made by H&R)
  c. Antioxidant (IRGANOX® 1076, made by CIBA)
  d. Carbon black (ISAF-HS N234, made by CHINA SYNTHETIC RUBBER CORPORATION)
  e. Zinc oxide (ZnO, made by HA)
  f. Stearic acid (TPSA1865)
  g. N-cyclohexyl-2-benzothiazole sulfenamide (CBS, made by FLEXSYS)
  h. Diphenyl guanidine (DPG, made by FLEXSYS)
  i. Sulfur (Triangle Brand)

<Rubber Composition (2)>

20 parts by weight of the modified high-cis conjugated diene polymer in embodiment 4 disclosed above, 80 parts by weight of the conjugated diene-vinyl aromatic hydrocarbon copolymer (SSBR-2) disclosed above, and materials disclosed below were milled in a Banbury type mixer. 85 parts by weight of white carbon, 30 parts by weight of oil, 1 part by weight of an antioxidant, 5 parts by weight of carbon black, 2 parts by weight of zinc oxide, and 1 part by weight of steric acid were added to mix. As a temperature was heated up to 150° C., a gel mixture was discharged. Then the gel mixture was aged for 24 hours. 1.8 parts by weight of CBS, 1.7 parts by weight of DPG, and 1.7 parts by weight of sulfur were added to the discharged gel mixture in a roller mixer for performing a vulcanization to obtain a rubber composition.

<Evaluation Method>
<Measurement of Loss Tangent at 0° C. (TAN δ (0° C.)) and Measurement of Loss Tangent at 60° C. (TAN δ (60° C.))>

The properties of each rubber composition were measured using a viscoelasticity measuring apparatus of the model number DMA Q800 made by TA Instruments, wherein the measurement mode was stretch mode, the measurement frequency was 20 Hz, the measurement item was tangent (Tan δ), the temperature rising rate in the measurement of loss tangent was 3° C./minute, and the temperatures in the measurement of loss tangent were chosen to be 0° C. and 60° C.

<Payne Effect (ΔE'=E'(0.5%)-E'(10%))>

The properties of each rubber composition were measured using a viscoelasticity measuring apparatus of the model number DMA Q800 made by TA Instruments. The measurement mode was stretch mode, and the measurement frequency was 20 Hz. The measurement item was dynamic storage elastic modulus (E), the temperature for measuring the dynamic storage elastic modulus (E) was set at 60° C., and the degree of deformation of the measurement was 0.5% to 10%. The dynamic storage elastic modulus difference (ΔE') was obtained by deducting the dynamic storage elastic modulus measured under the degree of deformation of 10% from the dynamic storage elastic modulus measured under the degree of deformation of 0.5%.

<Lamination Property to Scroll Wheel>

A lamination property of the rubber composition (about 1.4 kg) to a scroll wheel was measured by using double scroll wheel mixer (scroll wheel diameter of 6 inch) of model number MU2-2 made by Yi Tzung Precision Machinery Corporation. A scroll wheel measurement temperature was 40° C., rotating speeds for front and back scroll wheels were set to be 26 rpm/29 rpm. An initial gap distance between the scroll wheels was set to be 1 mm. It was tested whether the rubber composition could closely and obediently attach to the scroll wheel or not. If the rubber composition could closely and obediently attach to the scroll wheel, indicating the rubber composition had good lamination property, then the gap distance was increased to 2 mm to observe the lamination property to scroll wheel. If the rubber composition could not obediently attach to the scroll wheel, it means the rubber composition had poor lamination property.

<Garvey Die>

The measurement was performed by using ASTM D2230-96 method. The edge was graded to be 1-10, wherein the best condition was graded as 10. The surface appearance was graded to be A-E, wherein the best condition was graded as A.

Evaluation results of the rubber compositions (1) of embodiment 2, embodiment 4 and comparative example 5 are shown in table 4.

TABLE 4

| | | embodiment 2 | embodiment 4 | comparative example 5 |
|---|---|---|---|---|
| lamination property to scroll wheel | 26 rpm/29 rpm 1 mm | ○ | ○ | ○ |
| | 26 rpm/29 rpm 2 mm | ○ | ○ | ○ |

TABLE 4-continued

|  |  |  | embodiment 2 | embodiment 4 | comparative example 5 |
|---|---|---|---|---|---|
| Garvey die | 50 rpm | edge | 7 | 7 | 3 |
|  |  | surface appearance | A | A | C |
|  | 80 rpm | edge | 7 | 7 | 3 |
|  |  | surface appearance | A | A | C |
|  | 120 rpm | edge | 9 | 9 | 3 |
|  |  | surface appearance | A | A | C |
| Tanδ (0° C.) Index (%) |  |  | 100.4 | 100.4 | 100 |
| Tanδ (60° C.) Index (%) |  |  | 106.6 | 106.6 | 100 |
| Payne Effect (ΔE') Index (%) |  |  | 113.4 | 122.4 | 100 |

In table 4, Tan δ (0° C.) Index=(each of measurement values of embodiment 2, embodiment 4, and comparative example 5/the measurement value of comparative example 5)×100%. The larger value in the item "Tan δ (0° C.) Index" means the better wet skid resistance of the rubber composition. In table 4, Tan δ (60° C.) Index=(a measurement value of comparative example 5/each of measurement values of embodiment 2, embodiment 4, and comparative example 5)×100%. The larger value in the item "Tan δ (60° C.) Index" means the lower rolling resistance of the rubber composition, and thus less fuel of the transportation medium is consumed when applying the rubber composition for a tire. In table 4, (ΔE') Index=(a measurement value of comparative example 5/each of measurement values of embodiment 2 and embodiment 4, and comparative example 5)×100%. The larger value in the item "(ΔE') Index" means the better compatibility of the rubber composition with carbon black and white carbon (silica).

From the experimental results, it is found that the values of Tan δ (0° C.) Index of the rubber compositions of embodiment 2 and embodiment 4 are higher than that of the rubber composition of comparative example 5. It indicates that the rubber composition prepared by the method using a combination of TMOS and KBM-403 as the first modifier in the first stage and using the compound represented by the formula (1) as the second modifier in the second stage has better wet skid resistance.

The values of Tan δ (60° C.) Index of the rubber compositions of embodiment 2 and embodiment 4 are higher than that of the rubber composition of comparative example 5. It indicates that the rubber composition prepared by the method using a combination of TMOS and KBM-403 as the first modifier in the first stage and using the compound represented by the formula (1) as the second modifier in the second stage has lower rolling resistance, and thus less fuel of the transportation medium is consumed when applying the rubber composition for a tire.

The values of the dynamic storage elastic modulus difference (ΔE') Index of the rubber compositions of embodiment 2 and embodiment 4 are higher than that of the rubber composition of comparative example 5. It indicates that the rubber composition prepared by the method using a combination of TMOS and KBM-403 as the first modifier in the first stage and using the compound represented by the formula (1) as the second modifier in the second stage has better compatibility with white carbon (silica).

The measurement results of Garvey die of the rubber compositions of embodiment 2 and embodiment 4 are better than that of the rubber composition of comparative example 5. It indicates that the rubber composition prepared by the method using a combination of TMOS and KBM-403 as the first modifier in the first stage and using the compound represented by the formula (1) as the second modifier in the second stage has good lamination property to scroll wheel and good crumpling resistance, and thus has good processability. The measurement result of lamination property to scroll wheel of the rubber composition of comparative example 5 is good due to a content (20 parts by weight) of the modified high-cis conjugated diene polymer less than a content (80 parts by weight) of the conjugated diene-vinyl aromatic hydrocarbon copolymer (SSBR), which results in less effect to the measurement of lamination property to scroll wheel of the rubber composition.

Evaluation results of the rubber compositions (2) of embodiment 4, embodiment 5, embodiment 6 and comparative example 5 are shown in table 5.

TABLE 5

|  |  |  | embodiment 4 | embodiment 5 | embodiment 6 | comparative example 5 |
|---|---|---|---|---|---|---|
| lamination property to scroll wheel | 26 rpm/29 rpm 1 mm |  | ○ | ○ | ○ | ○ |
|  | 26 rpm/29 rpm 2 mm |  | ○ | ○ | ○ | ○ |
| Garvey die | 50 rpm | edge | 7 | 6 | 6 | 3 |
|  |  | surface appearance | A | A | A | C |
|  | 80 rpm | edge | 7 | 6 | 6 | 4 |
|  |  | surface appearance | A | A | A | C |
|  | 120 rpm | edge | 8 | 6 | 6 | 5 |
|  |  | surface appearance | A | A | A | B |
| Tanδ (0° C.) Index (%) |  |  | 95.9 | 102.8 | 96.8 | 100 |
| Tanδ (60° C.) Index (%) |  |  | 118.9 | 124.1 | 120.0 | 100 |
| Payne Effect (ΔE') Index (%) |  |  | 104.4 | 103.5 | 105.8 | 100 |

In table 5, Tan δ (0° C.) Index=(each of measurement values of embodiments 4 to 6 and comparative example 5/the measurement value of comparative example 5)×100%. The larger value in the item "Tan δ (0° C.) Index" means the better wet skid resistance of the rubber composition. In table 5, Tan δ (60° C.) Index=(a measurement value of comparative example 5/each of measurement values of embodiments 4 to 6 and comparative example 5)×100%. The larger value in the item "Tan δ (60° C.) Index" means the lower rolling resistance of the rubber composition, and thus less fuel of the transportation medium is consumed when applying the rubber composition for a tire. In table 4, (ΔE') Index=(a measurement value of comparative example 5/each of measurement values of embodiments 4 to 6 and comparative example 5)×100%. The larger value in the item "(ΔE') Index" means the better compatibility of the rubber composition with carbon black and white carbon (silica).

The values of Tan δ (60° C.) Index of the rubber compositions of embodiment 4, embodiment 5 and embodiment 6 are higher than that of the rubber composition of comparative example 5. It indicates that the rubber composition prepared by the method using a combination of TMOS and KBM-403 as the first modifier in the first stage and using the compound represented by the formula (1) as the second modifier in the second stage has lower rolling resistance, and thus less fuel of the transportation medium is consumed when applying the rubber composition for a tire.

The values of the dynamic storage elastic modulus difference (ΔE') Index of the rubber compositions of embodiment 4, embodiment 5 and embodiment 6 are higher than that of the rubber composition of comparative example 5. It indicates that the rubber composition prepared by the method using a combination of TMOS and KBM-403 as the first modifier in the first stage and using the compound represented by the formula (1) as the second modifier in the second stage has better compatibility with white carbon (silica).

The measurement results of Garvey die of the rubber compositions of embodiment 4, embodiment 5 and embodiment 6 are better than that of the rubber composition of comparative example 5. It indicates that the rubber composition prepared by the method using a combination of TMOS and KBM-403 as the first modifier in the first stage and using the compound represented by the formula (1) as the second modifier in the second stage has good lamination property to scroll wheel and good crumpling resistance, and thus has good processability.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A manufacturing method for a modified high-cis conjugated diene polymer, comprising:
    performing a polymerization reaction to form a high-cis conjugated diene polymer; and
    making the high-cis conjugated diene polymer react with a first modifier, and then react with a second modifier in the presence of a condensation accelerator to generate a modified high-cis conjugated diene polymer;
    wherein the modified high-cis conjugated diene polymer has over 97% of cis-1,4 structure;
    the second modifier comprises a compound represented by the following formula (1):

FORMULA (1)

$$H_3C-Si(CH_3)_2-[O-Si(CH_3)_2]_v-[O-Si(CH_3)(R^3)]_w-[O-Si(CH_3)(R^4)]_x-$$

-continued $$-[O-Si(CH_3)(R^6)]_y-[O-Si(CH_3)(R^7)]_z-O-Si(CH_3)_3,$$

with $R^6$ bearing an O-epoxycyclohexyl substituent and $R^7$ bearing a $Si(R^8)_3$ substituent wherein
    $R^3$ comprise a substituted or un-substituted $C_6$-$C_{16}$ hydrocarbon group containing an aryl group, or a substituted or un-substituted $C_2$-$C_{16}$ hydrocarbon group containing an amino group,
    $R^4$ comprise a substituted or un-substituted $C_2$-$C_4$ alkylene group, a group of $-(O-C_2H_4)-$, and a group of $-OR^5$,
    $R^5$ are a hydrogen atom or a substituted or un-substituted $C_1$-$C_3$ alkyl group,
    $R^6$ are substituted or un-substituted $C_2$-$C_4$ alkylene groups,
    $R^7$ are substituted or un-substituted $C_2$-$C_4$ alkylene groups,
    $R^8$ are $C_1$-$C_3$ alkoxy groups,
    v is 170-400,
    w is 0-45,
    x is 15-59,
    y is 0-43,
    z is 5-34,
    and a total of w, x and y is bigger than 0,
    $R^3$ are identical or different,
    $R^4$ are identical or different,
    $R^5$ are identical or different,
    $R^6$ are identical or different,
    $R^7$ are identical or different, and
    $R^8$ are identical or different;
    the first modifier comprises a compound represented by the following formula (2):

$$(R^1)_a-Si-(OR^2)_{4-a} \quad \text{FORMULA (2)}$$

wherein $R^1$ is a functional group comprising a glycidoxy group, 2-(3,4-epoxycyclohexyl) group or an isocyanate group, $R^2$ are substituted or un-substituted $C_1$-$C_3$ alkyl groups, a is 0 or 1, $R^2$ are identical or different.

2. The manufacturing method for the modified high-cis conjugated diene polymer according to claim 1, wherein
    $R^4$ are $-(C_3H_6)-(O-C_2H_4)_n-OR^5$,
    $R^5$ is a hydrogen atom or a substituted or un-substituted $C_1$-$C_3$ alkyl group, and
    n is 1-15.

3. The manufacturing method for the modified high-cis conjugated diene polymer according to claim 2, wherein for $R^4$ having $R^5$ being a hydrogen atom, n=$n_1$, wherein $n_1$ is 1-7; for $R^4$ having $R^5$ being a substituted or un-substituted $C_1$-$C_3$ alkyl group, n=$n_2$, wherein $n_2$ is 1-8.

4. The manufacturing method for the modified high-cis conjugated diene polymer according to claim 2, wherein for $R^4$ having $R^5$ being a hydrogen atom, n=$n_1$, wherein $n_1$ is 8-15; for $R^4$ having $R^5$ being a substituted or un-substituted $C_1$-$C_3$ alkyl group, n=$n_2$, wherein $n_2$ is 1-8.

5. The manufacturing method for the modified high-cis conjugated diene polymer according to claim 2, wherein a corresponding symbol of x for a structure unit having $R^4$ being —$(C_3H_6)$—$(O$—$C_2H_4)_n$—$OR^5$ with $R^5$ being a hydrogen atom is $x_1$, wherein $x_1$ is 10-38; a corresponding symbol of x for a structure unit having $R^4$ being —$(C_3H_6)$—$(O$—$C_2H_4)_n$—$OR^5$ with $R^5$ being a substituted or un-substituted $C_1$-$C_3$ alkyl group is $x_2$, wherein $x_2$ is 10-38.

6. The manufacturing method for the modified high-cis conjugated diene polymer according to claim 1, wherein the condensation accelerator contains a titanium atom, a tin atom, a zirconium atom, a bismuth atom or an aluminum atom.

7. The manufacturing method for the modified high-cis conjugated diene polymer according to claim 1, wherein the compound represented by the formula (2) comprises 2-glycidoxyethyl trimethoxysilane, 2-glycidoxyethyl triethoxysilane, 3-glycidoxypropyl trimethoxysilane, 3-glycidoxypropyl triethoxysilane, epoxycyclohexyl)ethyl trimethoxysilane, 2-(3,4-epoxycyclohexyl)ethyl triethoxysilane, 3-isocyanatopropyl trimethoxysilane, 3-isocyanatopropyl triethoxysilane, 3-isocyanatopropyl triisopropoxysilane, tetramethoxysilane, tetraethoxysilane, tetraisopropoxysilane or a combination thereof.

8. A modified high-cis conjugated diene polymer, comprising a polymer represented by the following formula (3):

FORMULA (3)

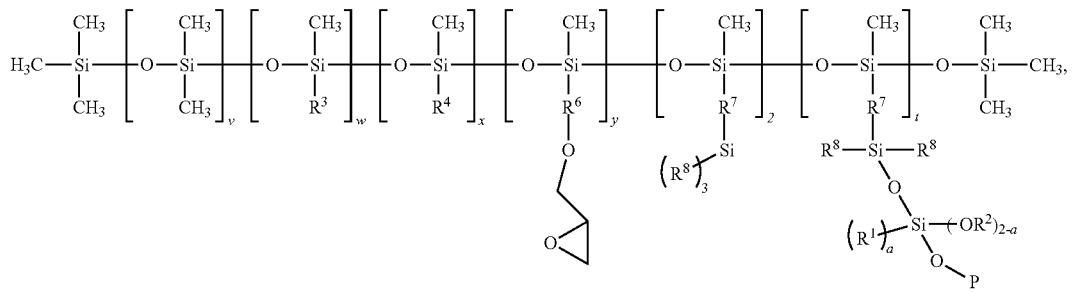

wherein
$R^1$ is a functional group comprising a glycidoxy group, 2-(3,4-epoxycyclohexyl) group or an isocyanate group,
$R^2$ are substituted or un-substituted $C_1$-$C_3$ alkyl groups or a hydrogen atom,
a is 0 or 1,
$R^3$ comprise a substituted or un-substituted $C_6$-$C_{16}$ hydrocarbon group containing an aryl group, or a substituted or un-substituted $C_2$-$C_{16}$ hydrocarbon group containing an amino group,
$R^4$ comprise a substituted or un-substituted $C_2$-$C_4$ alkylene group, a group of —$(O$—$C_2H_4)$—, and a group of —$OR^5$,
$R^5$ are a hydrogen atom or a substituted or un-substituted $C_1$-$C_3$ alkyl group,
$R^6$ are substituted or un-substituted $C_2$-$C_4$ alkylene groups,
$R^7$ are substituted or un-substituted $C_2$-$C_4$ alkylene groups,
$R^8$ are $C_1$-$C_3$ alkoxy group or hydroxyl group,
P is a conjugated diene polymer having over 97% of cis-1,4 structure,
v is 170-400,
w is 0-45,
x is 0-71,
y is 0-43,
and a total of w, x and y is bigger than 0,
t is 1-34,
z=t+s, and z is 5-34,
$R^2$ are identical or different,
$R^3$ are identical or different,
$R^4$ are identical or different,
$R^5$ are identical or different,
$R^6$ are identical or different,
$R^7$ are identical or different, and
$R^8$ are identical or different.

9. The modified high-cis conjugated diene polymer according to claim 8, wherein
$R^4$ are —$(C_3H_6)$—$(O$—$C_2H_4)_n$—$OR^5$,
$R^5$ are a hydrogen atom or a substituted or un-substituted $C_1$-$C_3$ alkyl group, and
n is 1-15.

10. The modified high-cis conjugated diene polymer according to claim 9, wherein
for $R^4$ having $R^5$ being a hydrogen atom, n=$n_1$, wherein $n_1$ is 1-7; for $R^4$ having $R^5$ being a substituted or un-substituted $C_1$-$C_3$ alkyl group, n=$n_2$, wherein $n_2$ is 1-8.

11. The modified high-cis conjugated diene polymer according to claim 9, wherein
for $R^4$ having $R^5$ being a hydrogen atom, n=$n_1$, wherein $n_1$ is 8-15; for $R^4$ having $R^5$ being a substituted or un-substituted $C_1$-$C_3$ alkyl group, n=$n_2$, wherein $n_2$ is 1-8.

12. The modified high-cis conjugated diene polymer according to claim 9, wherein
a corresponding symbol of x for a structure unit having $R^4$ being —$(C_3H_6)$—$(O$—$C_2H_4)_n$—$OR^5$ with $R^5$ being a hydrogen atom is $x_1$, wherein $x_1$ is 10-38; a corresponding symbol of x for a structure unit having $R^4$ being —$(C_3H_6)$—$(O$—$C_2H_4)_n$—$OR^5$ with $R^5$ being a substituted or un-substituted $C_1$-$C_3$ alkyl group is $x_2$, wherein $x_2$ is 10-38.

13. The modified high-cis conjugated diene polymer according to claim 9, wherein
a structure unit having $R^4$ being —$(C_3H_6)$—$(O$—$C_2H_4)_n$—$OR^5$ with $R^5$ being a hydrogen atom has a number of $x_1$ being 20-28, and has n=$n_1$ being 2-6; a structure unit having $R^4$ being —$(C_3H_6)$—$(O$—$C_2H_4)_n$—$OR^5$ with $R^5$ being a substituted or un-substituted $C_1$-$C_3$ alkyl group has a number of $x_2$ being 20-28, and has n=$n_2$ being 5-6.

14. The modified high-cis conjugated diene polymer according to claim 9, wherein
a structure unit having $R^4$ being —$(C_3H_6)$—$(O$—$C_2H_4)_n$—$OR^5$ with $R^5$ being a hydrogen atom has a number of $x_1$ being 20-28, and has $n=n_1$ being 8-13; a structure unit having $R^4$ being —$(C_3H_6)$—$(O$—$C_2H_4)_n$—$OR^5$ with $R^5$ being a substituted or un-substituted $C_1$-$C_3$ alkyl group has a number of $x_2$ being 20-28, and has $n=n_2$ being 5-6.

15. A tire, comprising the modified high-cis conjugated diene polymer according to claim 8.

* * * * *